US012183313B2

(12) United States Patent
Jowdy

(10) Patent No.: US 12,183,313 B2
(45) Date of Patent: Dec. 31, 2024

(54) LASER LIGHT-BASED CONTROL SYSTEM FOR USE WITH DIGITAL MUSICAL INSTRUMENTS AND OTHER DIGITALLY-CONTROLLED DEVICES

(71) Applicant: Jeffrey Scott Jowdy, South Pasadena, CA (US)

(72) Inventor: Jeffrey Scott Jowdy, South Pasadena, CA (US)

( * ) Notice: Subject to any disclaimer, the term of this patent is extended or adjusted under 35 U.S.C. 154(b) by 191 days.

(21) Appl. No.: 17/942,886

(22) Filed: Sep. 12, 2022

(65) Prior Publication Data

US 2024/0087546 A1 Mar. 14, 2024

(51) Int. Cl.
*G10H 1/00* (2006.01)

(52) U.S. Cl.
CPC ......... *G10H 1/0008* (2013.01); *G10H 1/0066* (2013.01); *G10H 2220/421* (2013.01); *G10H 2220/441* (2013.01)

(58) Field of Classification Search
CPC .. G10H 1/008; G10H 1/066; G10H 2220/421; G10H 2220/441
See application file for complete search history.

(56) References Cited

U.S. PATENT DOCUMENTS

2002/0005111 A1* 1/2002 Ludwig .................... G10H 1/00 84/645
2005/0024324 A1* 2/2005 Tomasi ............... G06F 3/04886 345/156
2006/0101349 A1* 5/2006 Lieberman ............ G06F 3/0426 715/773
2022/0347705 A1* 11/2022 Zimmerman ........... B05B 17/08
2024/0087546 A1* 3/2024 Jowdy .................. G10H 1/0008

FOREIGN PATENT DOCUMENTS

CN 1161527 A * 10/1997
CN 106297757 A * 1/2017
CN 208819590 U * 5/2019
CN 209766027 U * 12/2019
GB 2388632 A * 11/2003 ............. B05B 1/002

* cited by examiner

*Primary Examiner* — Robert W Horn
(74) *Attorney, Agent, or Firm* — Snell & Wilmer L.L.P.

(57) ABSTRACT

A laser light-based control system that makes use of intelligent motion tracking camera-based technologies to allow a performed to select notes, to provide a range of values for controlling device components (such as a fader), and to select a volume or magnitude value for a selected note (or output value). The control system may be configured in some implementations with the ability to filter out other light sources to only monitor a particular light from a source using real time video processing. This allows the control system to function to track simple and also complex laser animations and beam interruptions and, in response to the results of such tracking, to generate control signals for a digital music instrument to generate an endless amount of note values and variables (e.g., volume, pitch, and so on) in a 2D space or, in some preferred embodiments, a three dimensional (3D) space.

20 Claims, 8 Drawing Sheets

LASER LIGHT-BASED CONTROL SYSTEM FOR USE WITH DIGITAL MUSICAL INSTRUMENTS AND OTHER DIGITALLY-CONTROLLED DEVICES

BACKGROUND

1. Field of the Description

The present description relates, in general, to controllers and associated control methods for digital musical instruments that monitor interruptions in laser light (or laser beam), and, more particularly, to a control system (and control methods) that provides interactive, laser light-based control for artistic installations and live performances. The control system is configured to use motion tracking of interruptions to laser beams or laser light for the purpose, for example, of controlling faders, sliders, and digital music notes provides by a musical instrument via intelligent and dynamic laser light-based control of the instrument (or any digitally-controlled device). In the musical example, a participant or performer is able to use the control system to dynamically generate music notes, audio effects, and visual effects while interacting with static laser beams or with complex laser animations.

2. Relevant Background

Artists and performers continue to search for new ways of combining visual and audio technologies for the purposes of creating more entertaining shows and experiences for their audiences and patrons. For many years, laser light and sound have been combined to try to provide unique experiences. Since the 1980s, laser harps have been used in concerts and other settings to entertain crowds. A laser harp is an electronic musical user interface and laser lighting display. It projects several laser beams played by the musician by blocking them to produce sounds and is visually reminiscent of a harp.

In conventional laser harp technology, a set of fixed laser beams are provided by a laser or light source with each beam terminating at a known location at which a photo or light sensor is provided. The sensors output signals are processed by a controller to generate control signals for a musical instrument. Specifically, when a sensor detects light, the controller generates a note "off" value such that no notes are played by the musical instrument. When a sensor detects no light, the controller generates a note "on" value causing the musical instrument to play a note associated with that sensor and its associated static laser beam. In this way, a laser harp allows a performer or participant to play different music "notes" by interrupting the path between the laser light source and different ones of the light sensors.

While the light sensor setup for laser harps is the accepted approach to playing laser light as an instrument, its design presents a number of drawbacks and limitations. One drawback with a laser harp is the volatility of physical light sensors. For example, light sensors are often sensitive to accidental triggering due to their inability to differentiate laser light from other forms of light. Another drawback with traditional laser harp implementations is the painstakingly and labor intensive setup required for the instrument's application as each note requires its own light sensor to be manually fixed and placed. Further, once placed, the sensor cannot be moved from its position without ruining the harp effect, which can be difficult to prevent in an interactive space or on a live performance stage where equipment is often moved and restaged during a show such as between performers. Hence, there remains a demand for new systems for controlling digital music instruments via interaction with laser or other light.

SUMMARY

The inventor recognized that there is a demand for laser light-based controllers that facilitate dynamic control by a human performer or participant over a digital music instrument or other digitally-controlled device. In this regard, the inventor understood that the laser harp cannot be readily implemented as a dynamic controller. A light sensor-based laser harp requires a static or fixed laser beam in order to function properly, which limits the possibilities of a performer being able to interact with moving beams or animations. Such a setup with a laser harp would require a mechanically automated array of light sensors moving in perfect synchronicity with laser animations, which would make an already volatile setup even more prone to failure.

Another limitation with the use of light sensors in laser light-based control is their physical footprint in the world. While the light sensor setup of a laser harp allows for the playing of notes, it would require an array of numerous (e.g., hundreds to thousands) of tightly clustered light sensors to accurately replicate the large number of variables in a fader/slider and rotary knob of typical digital music instrument. While such a setup may be physical possible, it is impractical and would need constant attention and maintenance in order to function properly initially and over time.

The light sensor-based laser harp is also limited to a two dimensional (2D) space, in part, by the need to have the laser beams terminate at a set of light sensors. The inventor recognized that the 2D limitation eliminates the ability of an operator of laser harp to control variables beyond selection of notes including volume, pitch, and expression dynamics. The laser harp user can only play notes at a predetermined volume and pitch as the light sensor is only useful for determining on and off states (light or no light) and cannot be used to determine a distance in which the laser beam has been interrupted or blocked as measured from the beam's source.

With these and other limitations and drawbacks with prior laser-light based controls in mind, the inventor recognized that, in order to create a more entertaining, interactive, and stable controller for performers, there was a need to move away from the dated light sensor technologies to generate notes and values. To this end, a new laser light-based control system was created that makes use of intelligent motion tracking camera-based technologies to allow a performer to select notes, to provide a range of values for controlling device components (such as a fader), and to select a volume or magnitude value for a selected note (or output value). The control system may be configured in some implementations with the ability to filter out other light sources to only monitor a particular light from a source (laser light or light within a particular wavelength range) using real time video processing. This allows the control system to function to track simple and also complex laser animations and beam interruptions and, in response to the results of such tracking, to generate control signals for a digital music instrument to generate an endless amount of note values and variables (e.g., volume, pitch, and so on) in a 2D space or, in some preferred embodiments, a three dimensional (3D) space.

More particularly, a control system for use in controlling a digitally-controlled device based detection of interruptions of light output from a light source (such as a laser projector).

The control system or assembly includes a first camera operable to capture video images of a surface containing termination points of light output by a light source. The control system further includes a second camera operable to capture video images of a performance space disposed between an outlet of the light source and the surface containing the termination points. Additionally, the control system includes a controller communicatively linked to the first and second cameras to receive the video images of the surface containing the termination points and the video images of the performance space. Significantly, the controller executes code (or runs software) to provide a video-to-data processor that is configured to process the video images of the surface containing the termination points and the video images of the performance space. This processing identifies interruptions to the light output by the light source affecting the termination points and one or more beams of light passing through the performance space. Further, the controller is configured to generate and transmit/communicate control signals based on the interruptions that are configured to modify operations of a digitally-controlled device.

In some embodiments, the control signals include an on and off control value for an attribute of the digitally-controlled device and also a value within a range of values for an output parameter of the attribute. The video-to-data processor can be configured to process at least the video images of the performance space to determine a fractional amount of the interruption of the one or more beams of light passing through the performance space, and the value of the output parameter of the attribute is selected from the range of values by the controller based on the fractional amount of the interruption. In some useful implementations, the digitally-controlled device includes a digital music instrument, and the attribute is a note playable by the digital music instrument while the output parameter is volume. The video-to-data processor can also be configured to determine a distance between the outlet of the light source and the interruptions to the one or more beams of light passing through the performance space, and, with such a configuration, the fractional amount of the interruption is determined by the controller based on the distance.

In some implementations of the control system, the video-to-data processor is configured to partition the video images into zones that are associated with a control value for the digitally-controlled device (e.g., a note or the like for a musical instrument). The interruptions to the light output can, in some cases, be determined for the zones, and the control signals including the control value for the zones determined to be associated with the interruptions.

In some embodiments, the light source is a laser light source, and the light output by the light source includes colored laser beams. In such embodiments, the controller can generate the control signals to include control values to modify a color of the colored laser beams associated with the identified interruptions or to cause the colored laser beams associated with the identified interruptions to pulse or vibrate. In some cases, the light output by the light source is non-static such that one or more of the termination points moves over a time period, and at least the first camera is operable to track movements of the termination points during the time period.

DETAILED DESCRIPTION

Figure 1:
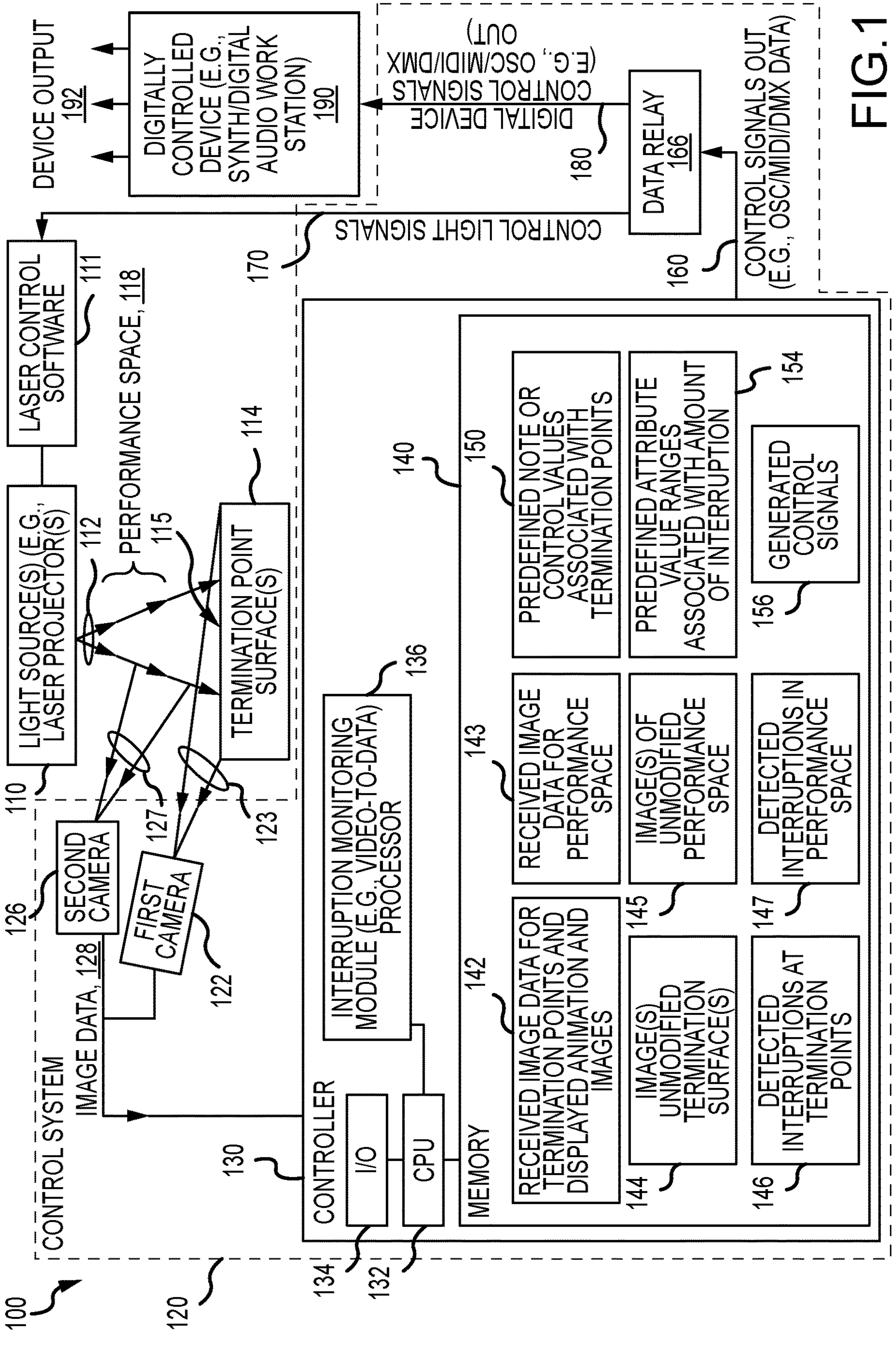
FIG. 1 is a functional block diagram of an audio and visual entertainment system with a laser light-based control system according to the present description.

In brief, embodiments described herein are directed toward audio and visual entertainment systems or other systems that make use of dynamic tracking of interruptions of projected light (e.g., from a light source in the form of one-to-many lasers or laser projectors). The tracking is "dynamic" in that the light, such as laser beams or light, does not have to be static, and the interruptions may be full or partial in one, two, or more planes (e.g., a 2D plane or a 3D volume or space).

Particularly, one plane in which light interruptions are tracked may be the planar surface(s) upon which a laser beam terminates or the surface containing laser termination points, which in some cases will be a horizontal (or vertical surface). The interruptions to the laser light may be full or partial, e.g., a performer may block a single laser beam or may partially block a laser animation or image. Based on detected full or partial interruptions in this plane (e.g., a termination point surface(s), a controller generates control signals to operate a digital music instrument(s) or other digitally controlled device.

A second plane or 3D space that is monitored for interruptions is the space (or a portion of such space that may be defined as a "performance space") between the outlet/lens of the light source (e.g., laser) and the surface(s) containing the termination points of the light. For example, the location of an interruption (e.g., a tracked position of a performer's hand) in a light beam(s) may be tracked to determine a distance from the light source to the interruption (or performer's hand or playing/interfacing tool). Based on this distance (or location of the interruption along the path of the laser beam), the controller may generate additional control signals to operate the digital music instrument or digitally controlled device. An example would be to set a volume of a note determined by the monitoring of termination points based on the interruption location or to operate a fader based on such distance to the interruption point on the beam's path, with the control signals varying over time with changes in the interruption location so as to provide dynamic control.

The control in either tracked plane(s) or space is dynamic also in that the controls are not necessarily binary (on or off) but, instead, may be any value in a predefined range (e.g., the determined distance to the interruption location may be given a value from 0 to 127 to match control inputs for a digital instrument based on where the interruption is within a performance space (e.g., zero at top (or bottom) of space and 127 at bottom (or top) of space) or based on a fraction of interruption or blockage is provided of a displayed image or animation at location of laser termination points. To control lighting, the range may be selected to suit the number steps that may be used to control attributes of a light or light source (such as 255 steps per channel or the like).

To provide these functions, the system includes, in addition to a light source and a digitally-operated device, an advanced laser-based controller. This new controller or control system is configured (with hardware and software) to operate by dynamically tracking laser animations and beams between single or two or more laser projection areas (or laser projector outlets/projection lenses) and termination points for this projected light using a single camera or using two or more cameras (e.g., digital video cameras or the like). The control system is configured, e.g., with a light monitoring or tracking module, to process interruptions in projected light (e.g., laser light or beams), and these interruptions may also include modulations and irregularities or changes over time the laser animations and beams (not only a blocking of the light).

The detected interruptions or changes to the animations, displayed images, or laser beams are converted by the control system into control signals, which may take a wide variety of forms including Open Sound Control (OSC) data, Musical Instrument Digital Interface (MIDI) data, Digital Multiplex Signal (DMX), ArtNET, or other lighting protocol data, or the like, to control digital instruments, to operate the light sources (e.g., to modify the displayed image or animation or to change the beam color, to pulse the beam, or to otherwise modify the output light to provide feedback to the performer and/or to modify the visual display provided by the system), to operate other digital devices (e.g., any systems, controllers, and programs capable of receiving and interpreting control signals (e.g., one of the forms of data noted above). The video cameras used in the control system to capture frames or "image data" to monitor interruptions or changes to the light or displayed images or animations may take a variety of forms such as a standard digital camera available now or in the future, a depth camera, a LIDAR camera, or the like.

FIG. 1 is a functional block diagram of an audio and visual entertainment system 100 with a laser light-based control system 120 according to the present description. To provide visual entertainment or laser light for use in control processes, the system 100 includes one or more light sources 110, which may be used to provide any type of light that is readily monitored for interruptions with laser projectors or sources being preferable in some settings as the laser light is more readily detected and monitored (e.g., other non-laser light is more easily filtered out of image data). The system 100 also includes one or more digitally-controlled devices, with one device 190 shown, that each operate to provide output 192. The device 190 may be nearly any system, computer, or program able to provide the output based on control signals 180, which may take the form of OSC, MIDI, and/or DMX data such that a digital musical instrument is one digitally-controlled device well suited for use in system 100.

Figure 2:
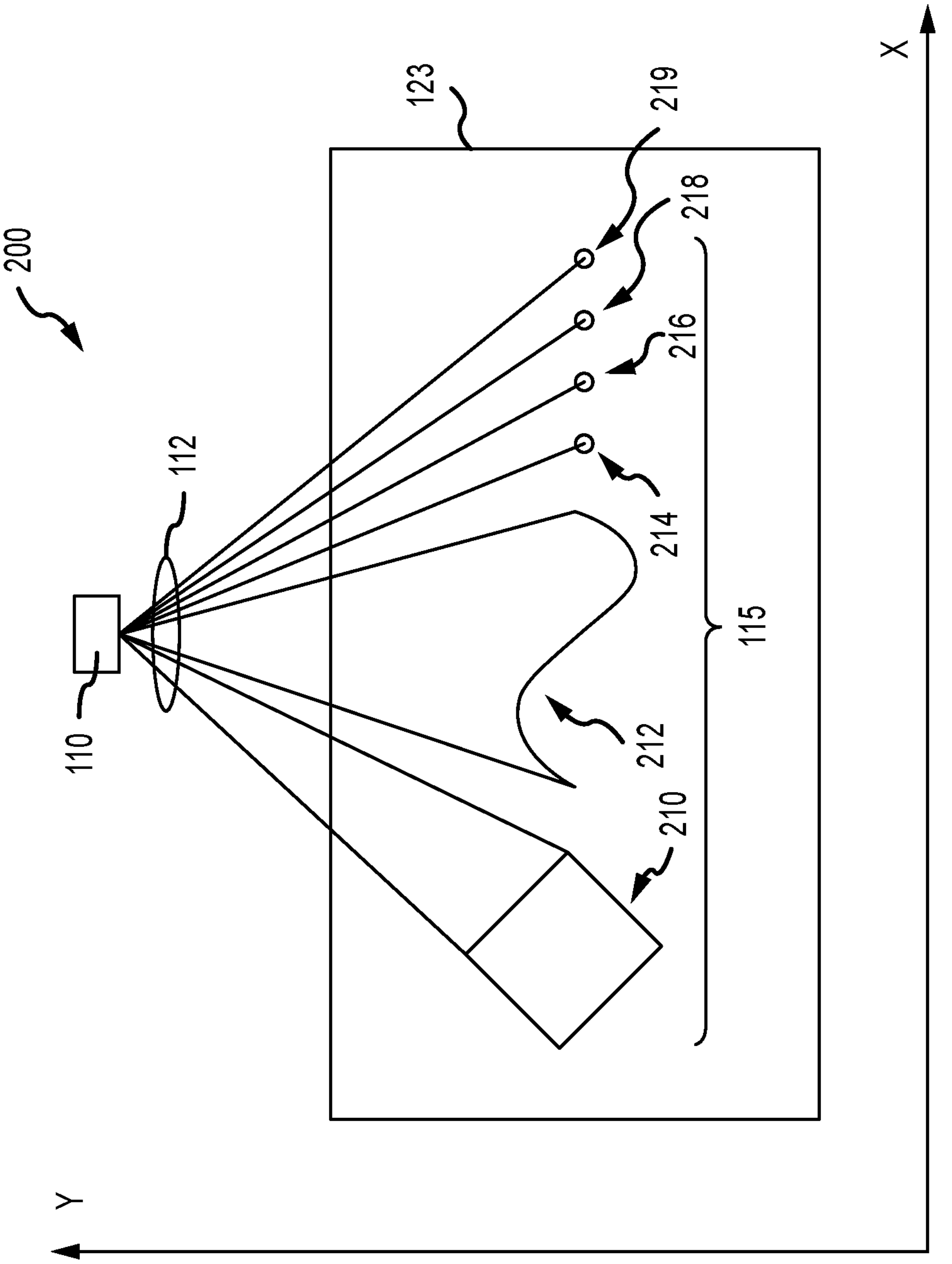
FIG. 2 is graphical representation of a set of image data or a video frame captured by one of the interruption tracking cameras of the system used to monitor changes in termination points including spots, images, and/or animations.
Figure 3:
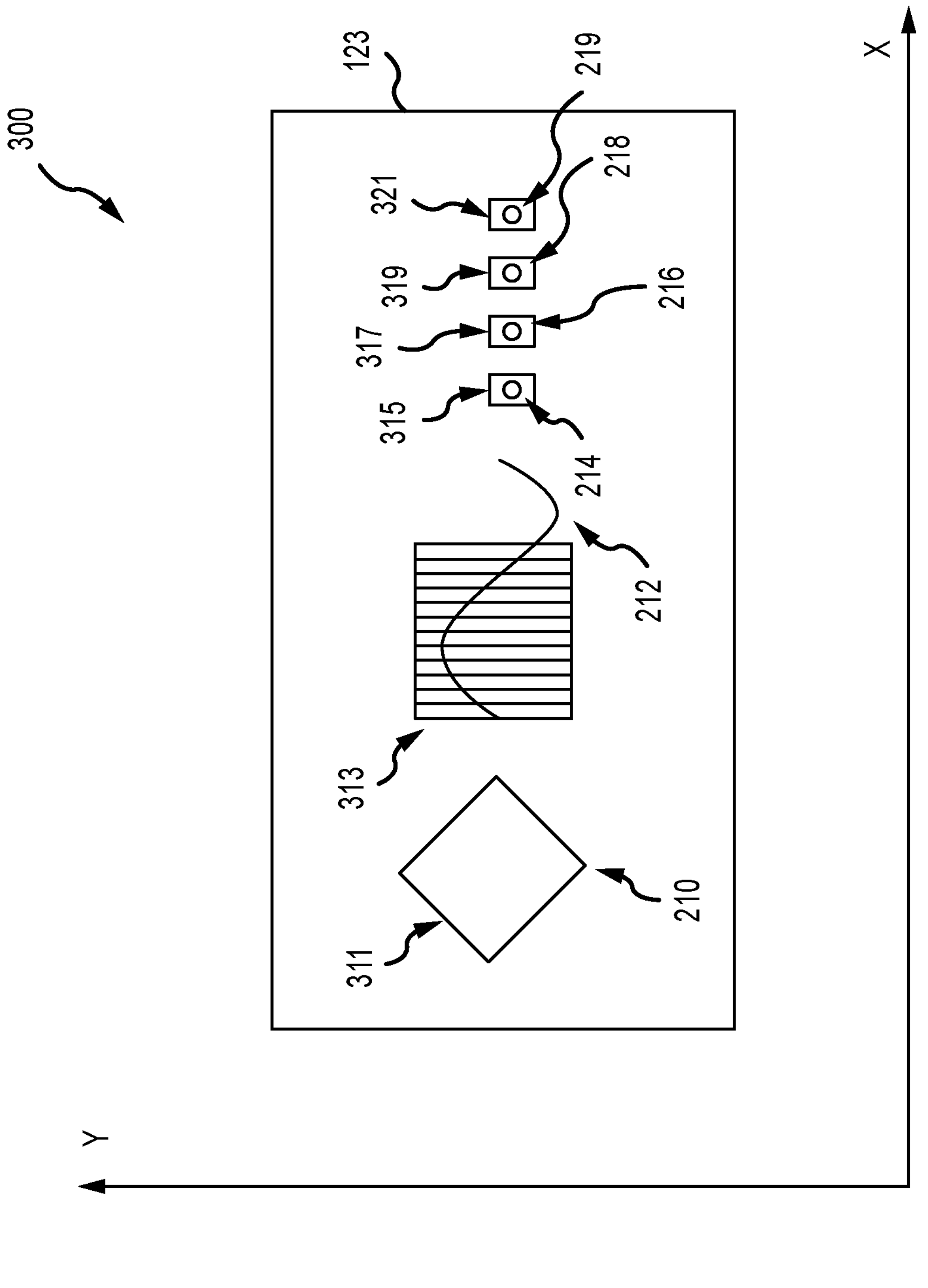
FIG. 3 is a graphical representation of the set of image data or the video frame of FIG. 2 showing exemplary zones assigned to the image to partition the imagery provided by the termination points of the laser light to facilitate tracking of interruptions.

During operations of the system 100, the light sources 110 are operated by a controller/laser control software 111 to output a light 112 that passes through a performance space 118 onto one or more termination point surfaces 114, with the laser light at these termination points 115 providing spots/dots in the case of beams, displayed images, and/or animations (as can be seen with reference to FIGS. 2 and 3). The light 112 in the performance space 118 may be provided in a plane (or be 2D) or may be provided in a 3D space or volume. A performer in or user (not shown) of the system 100 may use their hands or an object or tool to interact or "play" the light 112 by causing interruptions (partial or "full") or changes to the light 112, and these interruptions can be detected by visually monitoring the surface 114 and/or the performance space 118.

To this end, the system 100 includes a control system or assembly 120 that is configured to monitor or detect these interruptions and, in response, to generate control signals 160 to operate the light source 110 and/or the digitally-controlled device 190. Particularly, instead of using light sensors on surface 114, the control system 120 includes one or more digital cameras to visually monitor for the interruptions. In system 100, a first camera 122 is provided that is positioned and focused to capture a video image (e.g., a video frame(s)) as shown with arrows 123 of the termination point surface 114 so as to capture images of the termination points 115 over time (during operations of the system 100). Further, in system 100, a second camera 126 is provided that is positioned and focused to capture a video image (e.g., a video frame(s)) as shown with arrows 127 of the 2D or 3D performance space 118 including all or, more typically, a portion or subset of the output light 112 in between the outlet or projection lens or the source 110 and the termination point surface(s) 114. Instead of one camera for visually monitoring the surface 114 and one for visually monitoring the space 118, two or more cameras may be provided in the control system 120. The surface 114 may be generally orthogonal to the path of the light 112, which may travel vertically downward, but neither of these parameters is required to implement the system 120 (e.g., the surface 114 could be vertical and the path of light 112 horizontal and so on). The size of the performance space 118 may vary to practice the control system 120 and is typically selected to suit a particular performance and/or performer. For example, it may be 1 to 5 feet in height and 1 to 4 feet in width and may have first end proximate to the source 110 and a second end proximate to (e.g., spaced apart by 6 to 24 inches or more) or on the surface 114.

The control system 120 further includes a controller 130, which may take the form of nearly any computing device with a processor(s) 132 managing operations of input/output (I/O) devices 134. The controller 130 is communicatively coupled, in a wired or wireless manner, to the cameras 122 and 126 and the I/O devices 134 are used to receive the image data 128 captured (as shown by arrows 123, 127) by the cameras 122 and 126, and the processor 132 manages memory or data storage 140 in the controller 130 (or accessible by the controller 130). Particularly, the processor 132 stores the image data or video frames 128 from the first camera 122 as received image data 142 for termination points of the light 112, which may include animation and displayed images. Further, the processor 132 stores the image data or video frames 128 from the second camera 126 as received image data 143 for the performance space 118, which includes a portion of the projected or output light 112 from the light source 110.

The controller 130 includes software and algorithms (e.g., code executable by processor 132 to carry out the functions described herein for the controller 130) run by the processor 132 to process the received image data 142 and 143 and, in response, to generate control signals 160. As shown, the controller 132 includes an interruption monitoring module (or video-to-data/control signals processor program/software) 136 to process the received image data or frames of video 142 and 143 and to operate the light source 110 and digitally-controlled device 190 based on the results of this monitoring.

There are a number of ways that the module 136 may process the video 142, 143 to generate the control signals, and it may be useful to provide one useful example. In this example, images 144 and 145 are stored of the termination point surface 114 showing the termination points 115 provided by the light 112 when there are no interruptions or changes by a performer and showing the light 112 in the performance space 118 when there are no interruptions (for a particular time in a show being run or provided by the laser control software 111). With this image data/information in hand, the module 136 compares the received image data for termination points 142 and the received image data for the performance space 143 with the expected image data/video frames 144 and 145, respectively, to detect interruptions of the termination points 115 and in the performance space 118, with these interruptions stored in memory 140 by processor 132 as shown at 146 and 147. As discussed below, these interruptions may be full or whole blockages or interruptions of the light 112 or significantly may be partial interruptions (e.g., a determined portion of a displayed animation 115 on the surface 114 may be blocked by a performer or a portion of a beam of laser light 112 in the performance space 118 may be blocked such as with blockage at a determined distance from the outlet/projection lens of the light source 110).

To support generation of control signals 160, memory 140 may also be used to store a predefined note or control value 150 that is associated with each termination point, animation, displayed image, or portion thereof. Further, memory 140 may be used to store predefined attribute value ranges that are cross-referenced or associated with a predefined amount or magnitude of an interruption in the performance space 118 (e.g., is a beam wholly or fully blocked such as by placing a hand at the top of the performance space 118, which may be assigned a 0 attribute value (or maximum value) or only partially blocked by placing a performer's hand midway within the performance space 118 or at a distance from the source 110 linked to a 50-percent blockage of a laser beam, which may be assigned an attribute value at the middle of the predefined attribute value range such as 50 percent volume or the like).

As shown in memory 140, the module 136 may then generate control signals 156 by selecting the note or control values 150 and/or the attribute values in the ranges 154 based on the detected interruptions 146 and 147, respectively. The control signals 160, which may take the form of OSC, MIDI, DMX, or other data is transmitted in a wired or wireless manner by the I/O 134 of the controller 130 to a data relay 166, which responds by transmitting or relaying the light control signals 170 to the laser control software 111 for use in controlling or modifying operations of the light source 110, such as be changing a color of a partially interrupted laser beam in the light 112 or pulsing or vibrating this beam. The relay 166 is also configured to transmit or relay the control signals or data (e.g., OSC, MIDI, DMX, or other control data) 180 to the digitally-controlled device 190 to control or modify its operations and, thereby, control or modify the device output 192 (e.g., to select a note played, to vary the volume of the played note, to provide a fader effect, and so on).

FIG. 1 can be thought of as depicting the signal flow between a laser 110 and multiple cameras 122 and 126. The camera feeds 128 are sent to a real-time video processing program 136, which may be configured to filter and partition the frames or video images to better track the output light 112 (e.g., filter out light that is not laser light or in the wavelength ranges of output or projected light 112). The program 136 also is configured to assign values 156 to sections of the video where laser light is determined by the processing to be interrupted. The data or values 160 are sent to relay 166 for relaying to a digital instrument 190, for creating notes and controlling audio effects (in output 192) and for relaying to laser control software 111 to generate color change and/or vibration or animation changes in the laser light 112 (or in the source 110) being played by a performer interacting with light 112 in the performance space 118, which makes the experience provided by the system 100 more interactive.

In order to combine X, Y, and Z data (with the Z-axis being along the path of the displayed light from the light source), it is useful, as noted above, to provide at least the first camera 122 capturing, as shown at 123, video frames covering the termination points 115 of laser light 112 on surface(s) 114 and to also provide at least the second camera 126 capturing, as shown at 127, video frames covering the performance area or space 118. The controller 130, e.g., with video-to-data processor software 136, is configured to combine the video information (as shown at 128 in FIG. 1) in one or more video processing steps. The video processing to detect or identify interruptions may take the form provided above with reference to FIG. 1 or may take more of a partitioning and tracking approach as discussed below.

FIG. 2 is graphical representation 200 of a set of image data or a video frame 123 captured by one of the interruption tracking cameras of the system (e.g., by first camera 122 of system 100 shown in FIG. 1) used to monitor changes in termination points 115. The visual effect of the termination points 115 of the output or projected light 112 from the light source 110 on surface(s) 114, in this non-limiting example, includes an image 210, an animation 212, and a plurality of spots/dots 214, 216, 218, and 219.

FIG. 3 is a graphical representation 300 of the set of image data or the video frame 123 of FIG. 2 showing exemplary zones assigned to the image data 123 (e.g., by the controller 130 or, more specifically, the video-to-data processor 136 of FIG. 1) to partition the imagery provided by the termination points of the laser light to facilitate tracking of interruptions. As shown in graphic representation 300, the image data 123 is partitioned to provide or include a single zone 311 enclosing or capturing the image 210 with boundaries matching (or nearly so) that of the image 210. Each of the points, spots, or dots 214, 216, 218, and 219 provided by termination points 115 of the light 112 is enclosed or captured within separate zones 315, 317, 319, and 321, respectively, that are shown to be somewhat larger in size (e.g., a zone with boundaries spaced apart from the outer edges of the image being captured or tracked such as with spacing in the 0.25 to 1 inch range) than the spots 214-219 and of a different shape (but could be circular zones or other shapes than the rectangular shapes shown). The video-to-data processor 136 may be configured to treat these zones 311, 315, 317, 319, and 321 as go-or-no go (or binary) zones such that any blockage of the light 112 is considered as full blockage (which can be used to trigger playing a note or creating another attribute value associated with the zone). In contrast, the module or processor 136 may partition the image data or frame 123 to provide two or more zones 313 that enclose or capture the animation 212 (or a portion thereof as shown in FIG. 3). With this approach, the processor 136 may assign a parameter or attribute a value within a range of values based on which and/or how many of the zones are determined to have the light 112 at the termination points 115 interrupted or blocked, which provides a more dynamic control than simply on and off such as for use in assigning or controlling pitch and volume or operating a fader/slider when controlling a digital music instrument.

Figure 4:
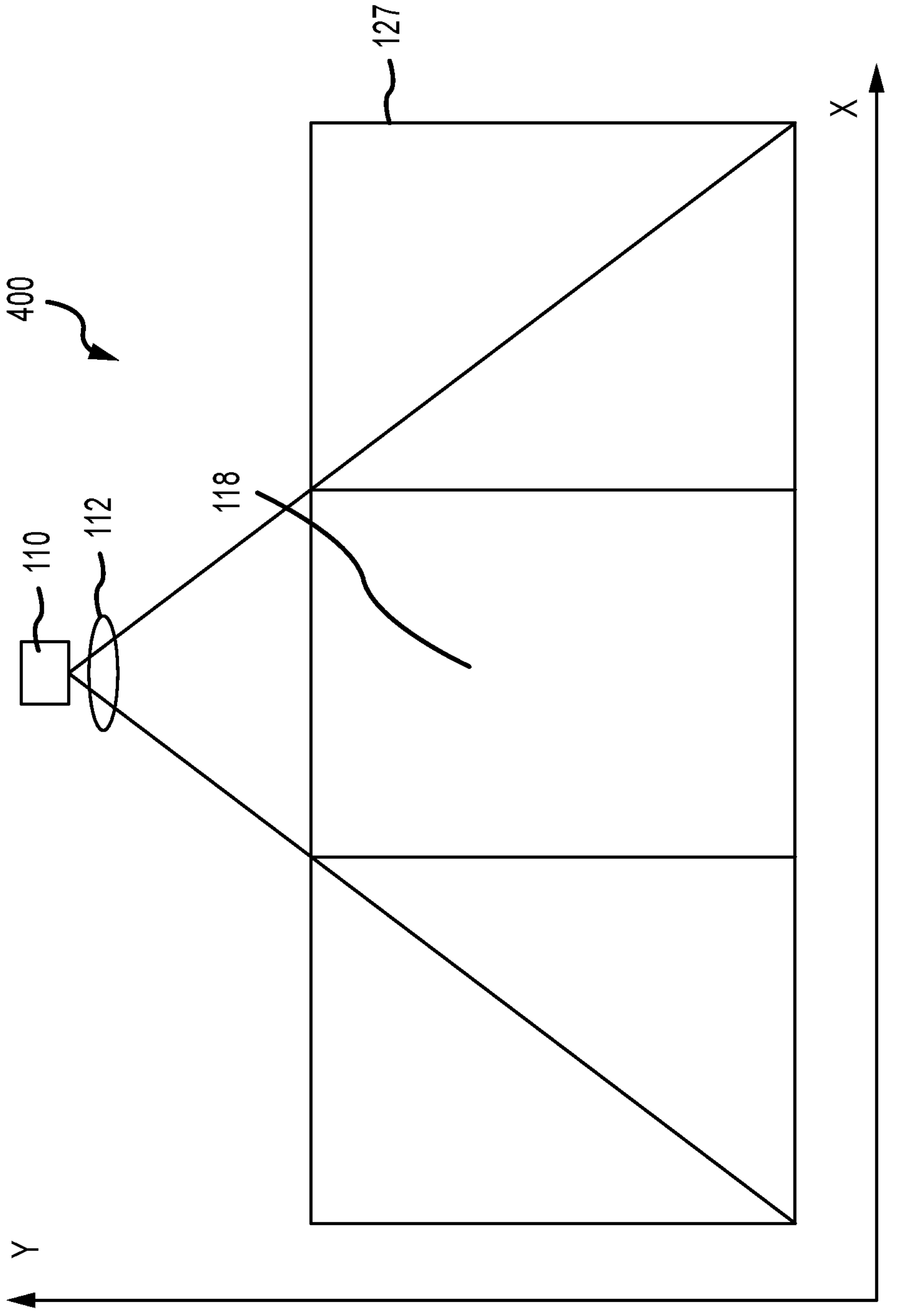
FIG. 4 is graphical representation of a set of image data or a video frame captured by one of the interruption tracking cameras of the system used to monitor changes in laser light in the performance space.
Figure 5:
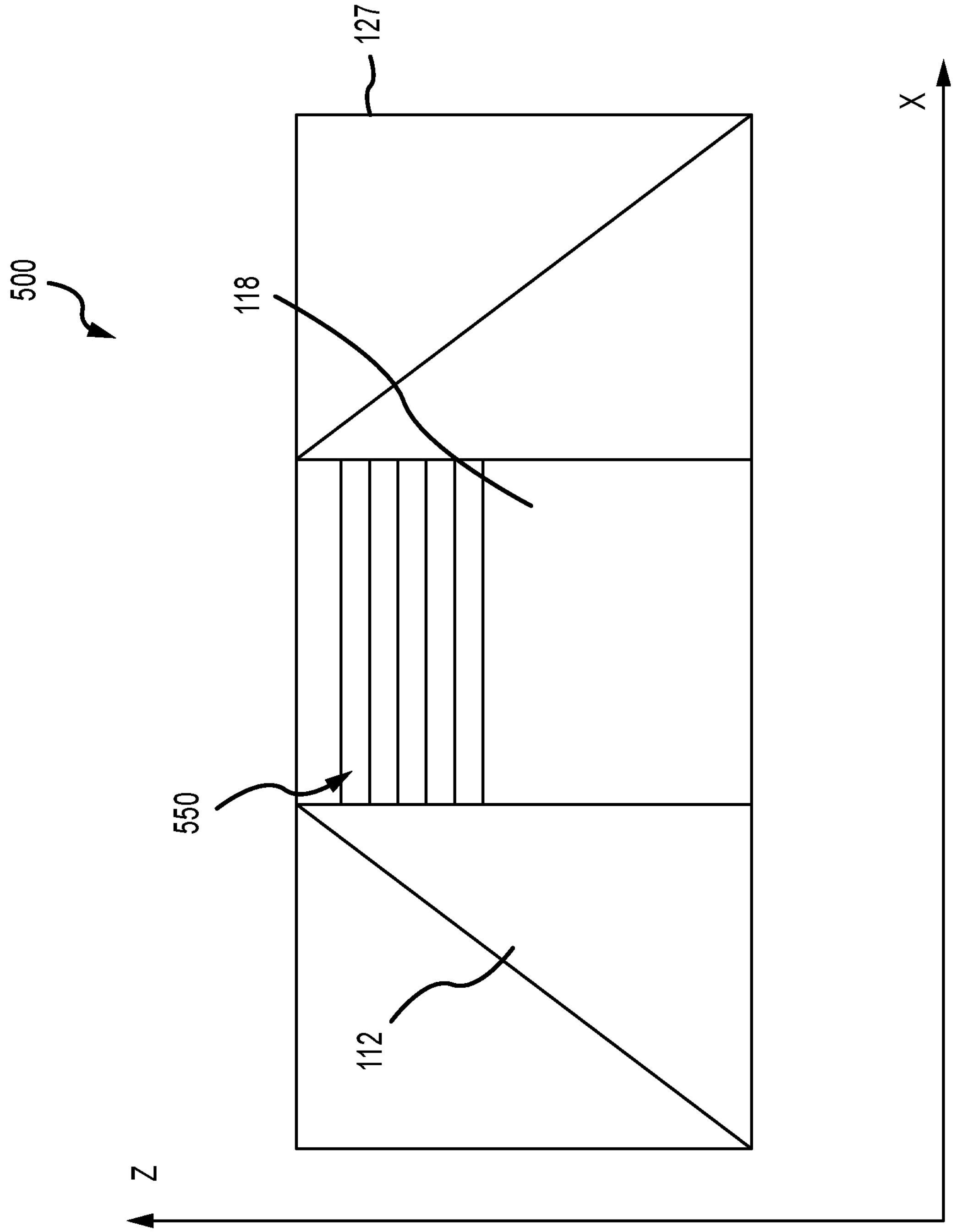
FIG. 5 is a graphical representation of the set of image data or the video frame of FIG. 4 showing exemplary zones assigned to the image to partition the imagery of the laser light in the performance space to facilitate tracking of interruptions.

Similarly, FIG. 4 is graphical representation 400 of a set of image data or a video frame 127 captured by one of the interruption tracking cameras of the system (e.g., camera 126 in control system 120 in FIG. 1) used to monitor interruptions or changes in laser light 112 from source 110 in the performance space 118. FIG. 5 is a graphical representation 500 of the set of image data or the video frame 127 of FIG. 4 showing exemplary zones 550 assigned to the image 127 to partition the imagery of the laser light 112 in the performance space 118 to facilitate determination of interruptions (and the distance from the source 110 of such interruptions) and, in response, assigning values within a range of attribute values to a particular attribute (such as note volume based on how many of the zones 550 are blocked or interrupted by a performer interacting with the light 112 in the performance space).

In some implementations of the control system 120, the module or processor 136 is configured to also process the partitioned video to crop it to the assigned zones so as to prevent any utilized tracking software from straying from one zone to another. Further, the module or processor 136 may be configured to color correct and filter the video/image data 142, 143 for each zone to display only bright laser light (e.g., only laser light having a predefined minimum brightness value). The laser light in each zone can be affixed with a digital tracker that is configured to follow any movement the laser 110 makes or to stay fixed to the laser beam if the laser 110 is static. The video zones can also be attached to the initial digital trackers and follow their movement for more stability and dynamic control. Each zone can be given an address and a value so that when the module or processor 136 fails to detect laser light in the zone, a value is sent out to any system (e.g., digitally-controlled device 190 in FIG. 1) listening for those values on the zone addresses.

In this example, each address may correspond to a note or a dynamic value for a digital instrument such that when the message is sent (e.g., with the control signal 160 in FIG. 1) to the digital instrument (e.g., the device 190 that operates to generate the output 192) it plays the note or changes the value assigned. As an example, MIDI instrument devices respond to a value between 0 and 127. So, the processor or module 136 can assign a note to an address such as C3 (MIDI value=60) to address/note one at a volume of 127 (MIDI value=full volume) such that when the laser beam in that video zone (such as one of zones 315, 317, 319, or 321 in FIG. 3) is interrupted the message sent to the digital instrument by the controller is "play C3 at full volume."

While the individual zones have individual values (e.g., on or off), more dynamic values are achieved by the controller by combining multiple zones as shown at 313 in FIG. 3. These multiple zones may be sent to a single address to create partially on or off values, which is much like a fader or velocity control to effect volume, reverb, delay, and/or any other dynamic controls available in a particular digital instrument. An example of this more dynamic control using multiple zones to select values in a range of attribute values would be a controller assigning C3 to/note once again, but, in this implementation, the controller is configured to assign laser beam video zones 0-127 to control the note and volume. With this arrangement, a user or performer can "partially" interrupt the beam or laser light so as to cause the controller to send out the message to the digital instrument to "play C3 at 60 percent (or some other attribute value) volume" by obstructing only a partial amount of the full 127 value (e.g., only blocking light in a subset of the zones associated with one or more termination points or a portion of the video data for the performance space).

Figure 6:
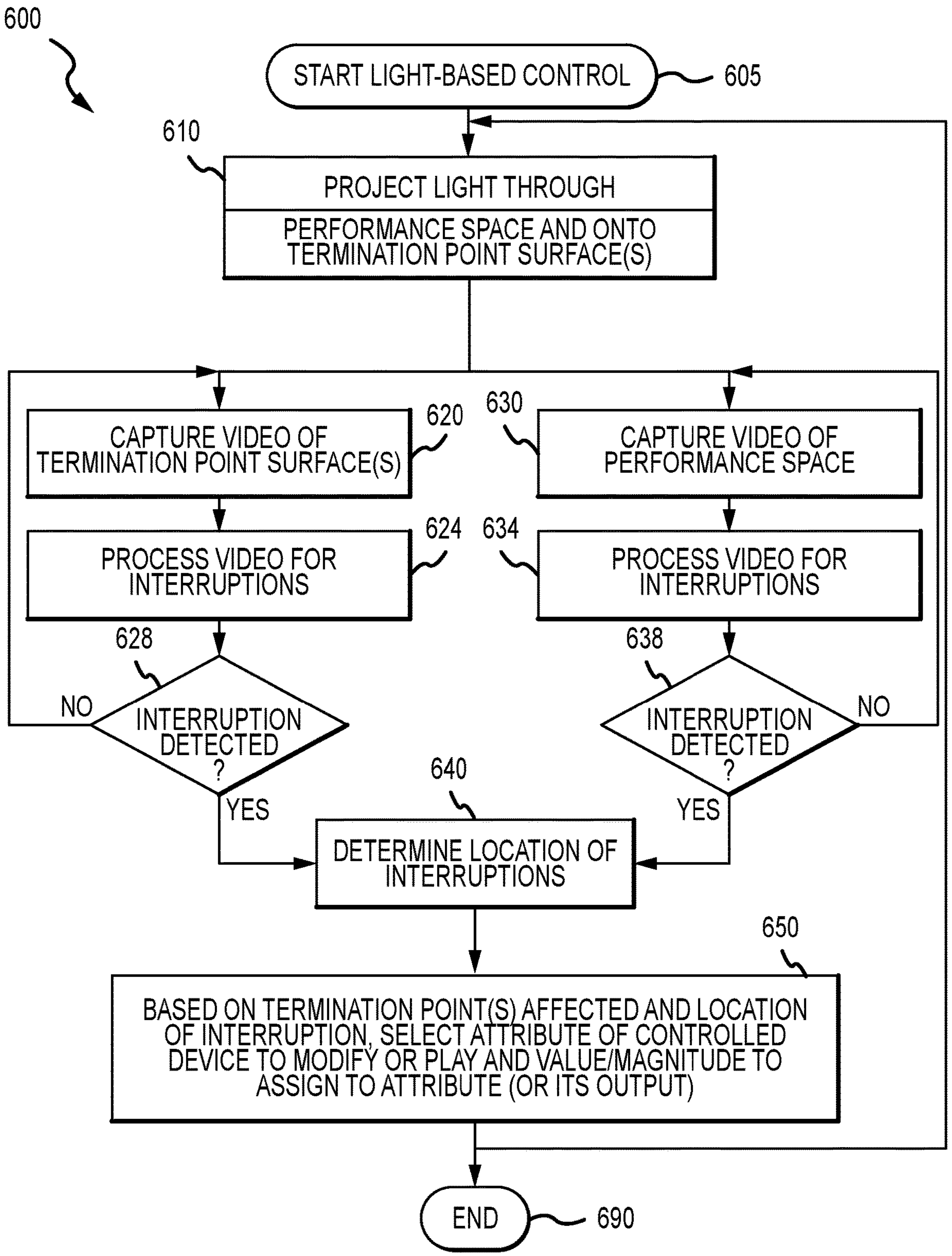
FIG. 6 is a flow diagram of a control method or algorithm that may be implemented via operations of the controller and control software of the system of FIG. 1 to provide control based on monitoring and/or tracking of light and interaction by a performer with the projected light.

FIG. 6 is a flow diagram of a control method or algorithm 600 that may be implemented via operations of the controller 130 and control software 136 of the control system 120 of FIG. 1 to provide control of a digitally-controlled device 190 (such as MIDI or other musical instrument) based on monitoring and/or tracking of light (e.g., laser light) 112 and interaction by a performer with the projected light 112 in a performance space 118. The method 600 starts at 605 such as with configuring a controller to generate control signals for a digitally-controlled device by downloading interruption monitoring and/or video-to-data processing software and defining in memory/data storage data and/or images for use in processing captured video and, in response, generating control signals for the digitally-controlled device.

Step 605 may further include physically configuring a space in which a laser projector or other light source will project light through a performance space onto one or more surfaces at which the light terminates (e.g., a surface(s) that will contain termination points of the laser light). Further, step 605 may include physically positioning and focusing two or more video cameras to concurrently capture video of the termination point surface(s) and the performance space, which will be a space between the light source (e.g., outlet of laser projector) and the termination point surface(s) with often with a known or predefined height (if vertical)/width (if horizontal) and depth (based on planned light projection pattern through the performance space). These cameras are communicatively coupled or connected to the controller to provide their output images or feeds to the controller for processing.

The method 600 continues at 610 with operating the light source to project light through the performance space onto the one or more surfaces where termination points of the light are to be located. The light source may be a laser(s) or laser projector(s) that is operated to output one or more laser beams onto the termination point surface(s), and the termination points may be configured or provided to provide spots/dots on the surface, to display images, and/or to display animation. The location of the termination points on the surface(s) may be static or fixed or may change or vary over time (e.g., movement of a laser projector or its output laser light may be choreographed to provide a desired laser-based show).

As shown in FIG. 6, the method 600 next continues along two paths that may be performed concurrently to monitor or track interruptions to the projected light from step 610 on the termination point surface(s) and within the performance space. At step 620, the method 600 involves operating one or more of the video cameras to capture video or image frames of the termination point surface(s), and a video feed is provided to the controller. At 624, the video-to-data processor or algorithm run by the controller is used to process the video feed to identify whether or not there are interruptions to the light at the termination points. A query is made at 628, and, if no interruptions are detected, the method 600 continues at 620 with capturing addition video of the termination point surface(s). If an interruption is detected, the method 600 continues at 640.

While this video processing is occurring, the method 600 also includes at 630 operating one or more of the cameras to capture video or image frames of the performance space through which the light from the light source is passed, and the captured video or feed is communicated to the controller. At 634, the controller uses the video-to-data processor or algorithm to process the video feed to identify whether or not there are interruptions to the light passing through the performance space. A query is made at 638, and, if no interruptions are detected, the method 600 continues at 630 with capturing additional video of the performance space and light (e.g., laser beams) therein. If an interruption is detected, the method 600 continues at 640.

In step 640, the method 600 includes using the video-to-data processor or algorithm to detect the location of the interruptions in the termination points and/or in the light passing through the performance space. This may include determining which termination point or points is affected by the light interruption (modification or blockage), which zones are interrupted (if partitioning is used as discussed above), and/or a distance from the light source to where the interruption occurred in the performance space.

Then, at step 650, the method 600 includes the controller generating control signals to operate the digitally-controlled device based on the results of the tracking of or monitoring for interruptions in both the termination point surface and the performance space. Particularly, based on the termination point(s) affected by the interruption and the determined location of the interruption, the controller is configured to select an attribute of the digitally-controlled device to modify or play (initiation output of) and also to select or assign a value (or magnitude) of a parameter associated with the attribute (e.g., a volume for playing a note (with the volume being the output value and the note being the attribute of the device being modified or initiated/played)). The method 600 may then continue at 610 or may end at 690.

Figure 7:
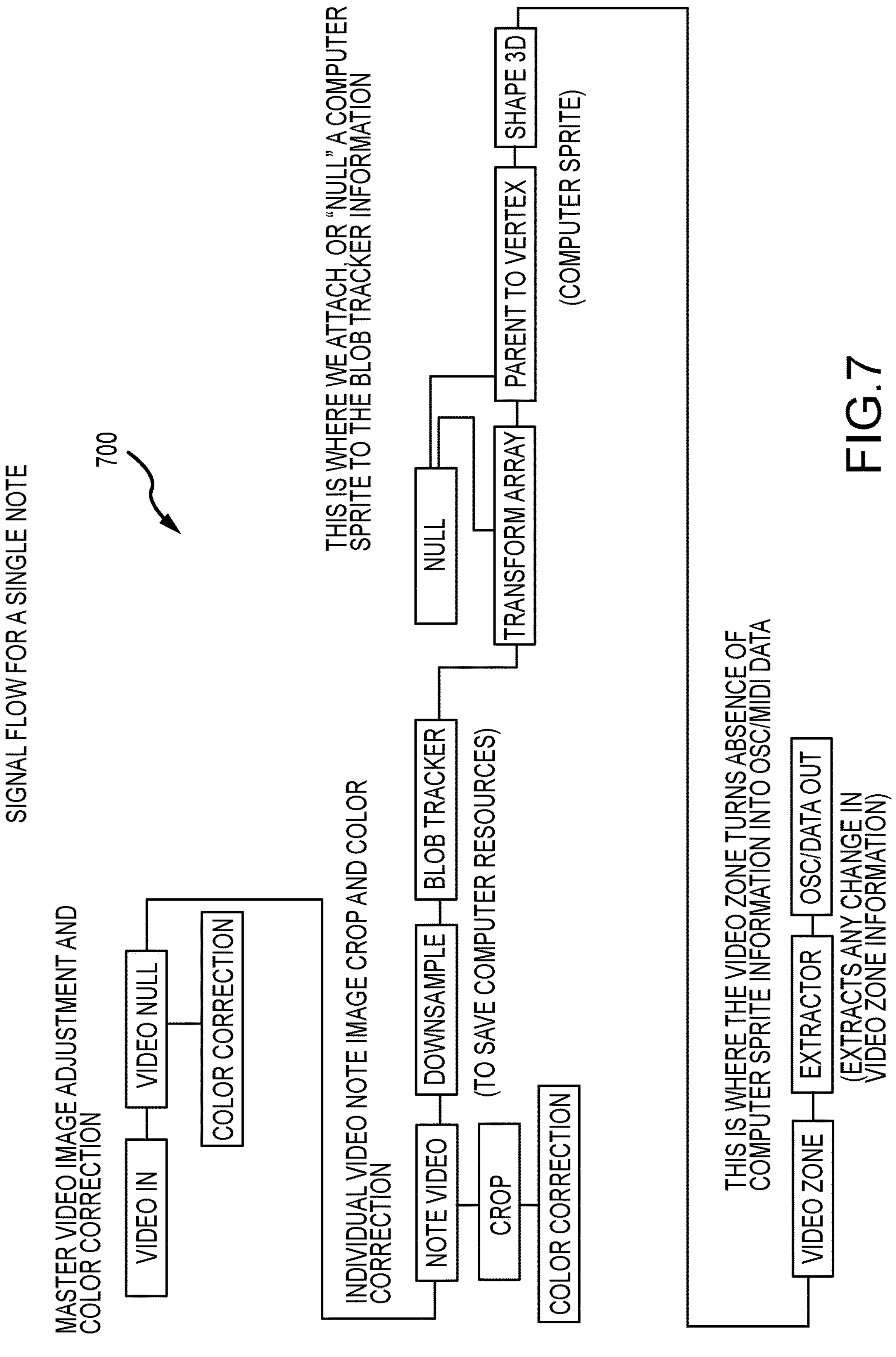
FIG. 7 illustrates note signal flow in a computer providing video-to-data processing as described herein such as during operations of the system of FIG. 1.
Figure 8:
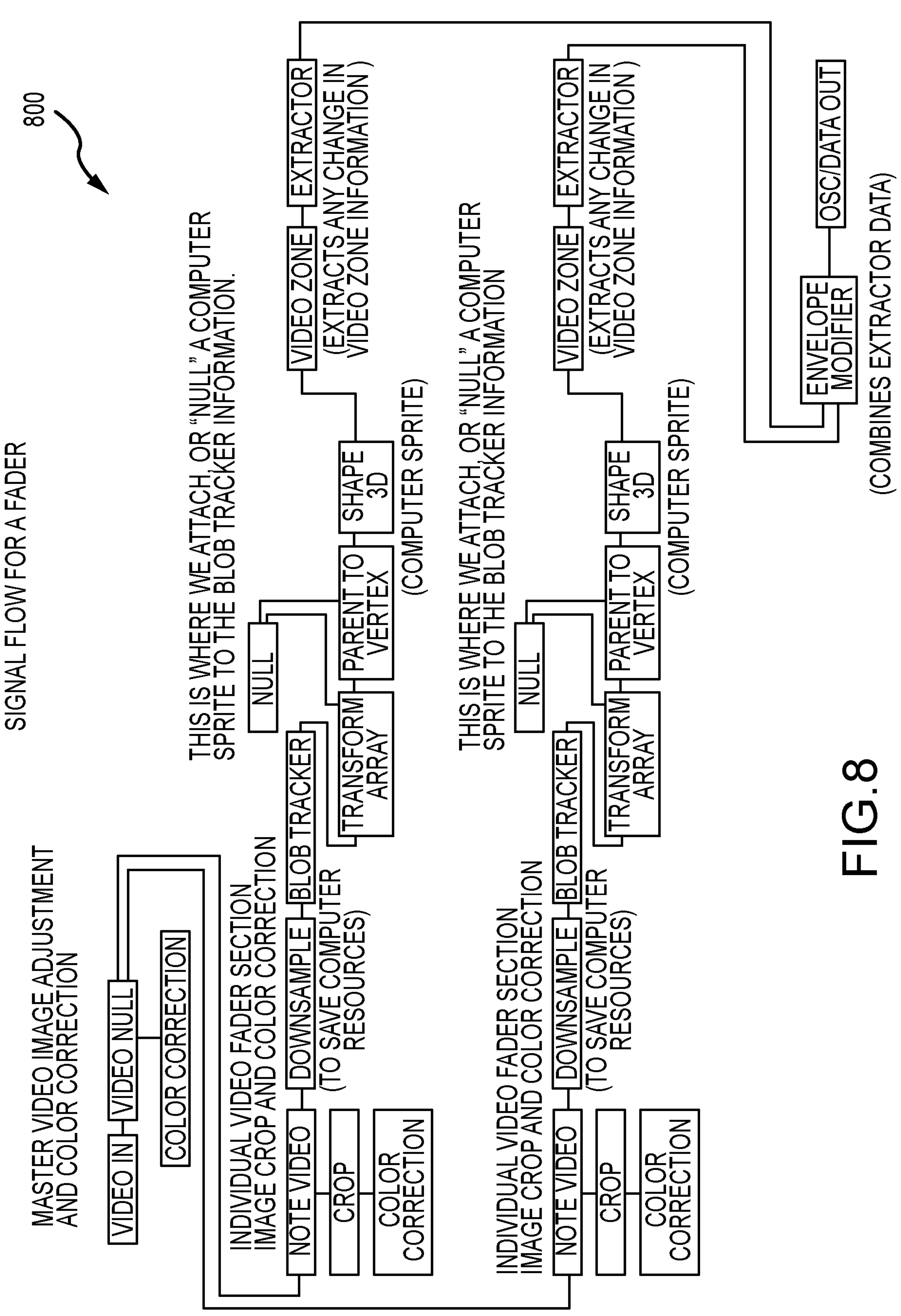
FIG. 8 illustrates signal flow in a computer providing a fader functionality with video-to-data processing as described herein such as during operations of the system of FIG. 1

As discussed above, the video-to-data processing performed, for example, by the module 136 in the system 100 of FIG. 1, may be performed in a variety of manners to practice the invention. However, it may be useful at this point in the description to provide an exemplary step by step description of one useful process. This description will be understood readily by one skilled in the arts or industry and particularly with reference to the signal flow diagrams 700 and 800 provided in FIGS. 7 and 8 that show node graph signal flow in a computer (e.g., controller 130 running software to provide the functions of module 136 in FIG. 1) while processing a note and while providing fader functions, respectively.

To perform the video processing, one may use a real time video processing node based code graph (Notch) in order to convert sections of the captured video from the cameras into data. From the main video input, the master video file can be processed for any color corrections needed on the overall input video. This may include pulling down mid and low color tones (like red, green, and blue color tones) and/or adjusting whites and blacks and saturation to only or substantially only allow laser light to be seen in the main video.

After this processing is complete, the video may be split prior to further processing such as five times to create five individual notes. For each individual note, the video around the corresponding laser beam's path or movement can be cropped out and individual color correction can be performed if needed or useful. Then, a blob tracker is attached to the video to follow laser movement within the cropped video.

The video-to-data processing may then continue with providing a way for the computer to understand that the absence of tracking data means it should generate a "note on" signal. As a first step, one can null a computer sprite to the blob tracker. Then, as a second step, a video zone can be created around the cropped image that will generate a change in information when the computer sprite is absent. From the video zone, an extractor can be used to extract any change in the video zone data and convert it into OSC data (or midi data if the code base allows).

When constructing a fader or slider, one can perform the same steps as creating an individual note but, instead or additionally, make multiple video zones, which can be anywhere from 0-100s of video zones depending on a computer's capabilities, with extractor values that combine in an envelope modifier for a total value between 0 and 100 percent on/off.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A control system for use in controlling a digitally-controlled device based on interruptions of light output from a light source, comprising:

- a first camera operable to capture video images of a surface containing termination points of light output by a light source;
- a second camera operable to capture video images of a performance space disposed between an outlet of the light source and the surface containing the termination points; and
- a controller communicatively linked to the first and second cameras to receive the video images of the surface containing the termination points and the video images of the performance space,
- wherein the controller executes code to provide a video-to-data processor configured to process the video images of the surface containing the termination points and the video images of the performance space to identify interruptions to the light output by the light source affecting the termination points and one or more beams of light passing through the performance space, and
- wherein the controller generates control signals based on the interruptions that are configured to modify operations of a digitally-controlled device.

2. The system of claim 1, wherein the control signals include an on and off control value for an attribute of the digitally-controlled device and a value within a range of values for an output parameter of the attribute.

3. The system of claim 2, wherein the video-to-data processor is configured to process at least the video images of the performance space to determine a fractional amount of the interruption of the one or more beams of light passing through the performance space and wherein the value of the output parameter of the attribute is selected from the range of values by the controller based on the fractional amount of the interruption.

4. The system of claim 3, wherein the digitally-controlled device comprises a digital music instrument, wherein the attribute is a note playable by the digital music instrument, and wherein the output parameter is volume.

5. The system of claim 3, wherein the video-to-data processor is configured to determine a distance between the outlet of the light source and the interruptions to the one or more beams of light passing through the performance space and wherein the fractional amount of the interruption is determined by the controller based on the distance.

6. The system of claim 1, wherein the video-to-data processor is configured to partition the video images into zones that are associated with a control value for the digitally-controlled device, wherein the interruptions to the light output are determined for the zones, and wherein the control signals include the control value for the zones determined to be associated with the interruptions.

7. The system of claim 1, wherein the light source is a laser light source and the light output by the light source includes colored laser beams and wherein the controller generates the control signals to include control values to modify a color of the colored laser beams associated with the identified interruptions or to cause the colored laser beams associated with the identified interruptions to pulse or vibrate.

8. The system of claim 1, wherein the light output by the light source is non-static such that one or more of the termination points moves over a time period and wherein at least the first camera is operable to track movements of the termination points during the time period.

9. A method for controlling a device based on tracked interruptions to laser light, comprising:

projecting one or more laser beams, wherein the one or more laser beams travel through a performance space onto termination points on one or more surfaces;

capturing video of the one or more surfaces including the termination points;

capturing video of the one or more laser beams in the performance space;

processing the video of the one or more surfaces to identify blockage of the one or more laser beams prior to reaching one or more of the termination points;

processing the video of the one or more laser beams in the performance space to determine a location of the blockage of the one or more laser beams; and generating control signals to control or modify operations of the device based on both the identified blockage and the location of the blockage.

10. The method of claim 9, wherein the device comprises a digital music instrument and wherein the control signals comprise MIDI data.

11. The method of claim 10, wherein the blockage affects one or more of the termination points, wherein the generating of the control signals includes assigning a note to play based on the affected one or more termination points, and wherein the generating of the control signals includes assigning a control value for the note based on the location of the blockage in the performance space.

12. The method of claim 11, wherein the control value sets a volume for the digital musical instrument to play the note using the MIDI data.

13. The method of claim 9, wherein the generating of the control signals includes determining at least one of the one or more laser beams associated with the blockage and wherein the control signals are configured to cause the at least one of the one or more laser beams to pulse or to change color in response to the blockage.

14. The method of claim 9, wherein the capturing of the video of the one or more surfaces includes tracking movement of the one or more termination points during an operating period of a laser providing the one or more laser beams.

15. A system, comprising:

a source of laser light;

a surface for receiving the laser light at a set of termination points;

a first camera focused on the surface;

a second camera focused on a space between the source of the laser light and the surface;

a digital musical instrument; and a controller communicatively linked to the first and second cameras and to the digital musical instrument, wherein the controller is configured to receive output feeds from the first and second cameras, to process the output feeds into control data based on detected interruptions of the laser light in the space, and to communicate the control data to the digital musical instrument to modify operations of the digital musical instrument.

16. The system of claim 15, wherein the control data includes MIDI or DMX data.

17. The system of claim 16, wherein the modified operations include playing a note, a slider, or a fader.

18. The system of claim 16, wherein the control data defines a note to play based on an interruption determined by processing the output feed from the first camera and defines a volume of the note with the MIDI data based on a location of the interruption in the space determined by processing the output feed from the second camera.

19. The system of claim 15, wherein the controller is configured to partition video in at least the output feed from the first camera into zones each associated with an operating attribute of the digital musical instrument and wherein the processing of the output feed from the first camera comprises determining whether a full or partial blockage of the laser light is present in one of the zones, and wherein the control data defines the operating attribute based on the one of the zones associated with the full or partial blockage of the laser light.

20. The system of claim 15, wherein the controller is further communicatively linked to the source of the laser light and wherein the control data comprises OSC data configured to modify a color of the laser light or to pulse the laser light associated with at least one of the detected interruptions.

* * * * *